(12) United States Patent
Keeley

(10) Patent No.: US 10,202,961 B2
(45) Date of Patent: Feb. 12, 2019

(54) FLUID TURBINE SEMI-SHROUD AND ASSOCIATED ROTOR BLADE DUAL-WINGLET DESIGN

(71) Applicant: William Scott Keeley, Charlestown, RI (US)

(72) Inventor: William Scott Keeley, Charlestown, RI (US)

(*) Notice: Subject to any disclaimer, the term of this patent is extended or adjusted under 35 U.S.C. 154(b) by 246 days.

(21) Appl. No.: 15/365,648

(22) Filed: Nov. 30, 2016

(65) Prior Publication Data
US 2018/0149134 A1 May 31, 2018

(51) Int. Cl.
*F03D 1/04* (2006.01)
*F03D 1/06* (2006.01)

(52) U.S. Cl.
CPC .......... *F03D 1/04* (2013.01); *F03D 1/0633* (2013.01); *F05B 2240/221* (2013.01); *F05B 2240/30* (2013.01)

(58) Field of Classification Search
CPC ........ F03D 1/04; F03D 1/0633; F03D 1/0641; F05B 2240/221; F05B 2240/30
See application file for complete search history.

(56) References Cited

U.S. PATENT DOCUMENTS

| | | | |
|---|---|---|---|
| 120,562 A | 10/1871 | Cracraft | |
| 8,128,035 B2 | 3/2012 | Malachowski et al. | |
| 8,944,386 B2 | 2/2015 | Gratzer | |
| 2010/0166556 A1* | 7/2010 | Kirtley | F03D 1/06 416/179 |
| 2012/0141250 A1* | 6/2012 | Kinzie | F03D 1/04 415/1 |
| 2013/0015666 A1* | 1/2013 | Wilson | F03D 1/04 290/55 |
| 2013/0309081 A1* | 11/2013 | Hjort | F03D 1/04 415/211.2 |
| 2014/0169937 A1 | 6/2014 | Gysling et al. | |
| 2015/0003994 A1 | 1/2015 | Braaten et al. | |
| 2015/0300316 A1 | 10/2015 | Wepfer | |

FOREIGN PATENT DOCUMENTS

GB 2593362 B1 9/2014

OTHER PUBLICATIONS

"Short KVSR Medium 5" (Mark J Keeley) Jul. 13, 2016 [video] accessed Mar. 20, 2017 at <https://youtube.be/zCVgusrr3VA>.

* cited by examiner

*Primary Examiner* — Ryan A Reis
(74) *Attorney, Agent, or Firm* — Keeley DeAngelo LLP; W Scott Keeley

(57) ABSTRACT

A semi-ringed airfoil is designed in conjunction with a fluid turbine rotor blade to provide increased rotor-tip speed, increased coefficient of power, reduced wind shear and reduced noise. A dual-winglet rotor blade in combination with a semi-ringed airfoil increases the above mentioned benefits by increasing the rotor-blade tip surface-area that is in contact with the area of increased fluid velocity over the semi-ringed airfoil.

8 Claims, 12 Drawing Sheets

FLUID TURBINE SEMI-SHROUD AND ASSOCIATED ROTOR BLADE DUAL-WINGLET DESIGN

BACKGROUND

1. Technical Field

The present disclosure relates to shrouded and ducted fluid turbines and to fluid turbine rotor blade design.

2. Background

In general, horizontal axis fluid turbine rotor blades comprise two to five blades arranged evenly about a central axis and coupled to an electrical generation machine.

Generally speaking, a fluid turbine structure with, for example, an open unshrouded rotor design captures energy from a fluid stream that is smaller in diameter than the rotor. In an open unshrouded rotor fluid turbine, as fluid flows from the upstream side of the rotor to the downstream side, the average axial fluid velocity remains constant as the flow passes through the rotor plane. Energy is extracted at the rotor resulting in a pressure drop on the downstream side of the rotor. The fluid directly downstream of the rotor consists of air that exists at sub-atmospheric pressure due to the energy extraction. The fluid directly upstream of the rotor consists of air that exists at greater than atmospheric pressure. The high pressure upstream of the rotor deflects some of the upstream air around the rotor. In other words, a portion of the fluid stream is diverted around the open rotor as if by an impediment. As the fluid stream is diverted around the open rotor, it expands, which is referred to as flow expansion at the rotor. Due to the flow expansion, the upstream area of the fluid flow is smaller than the area of the rotor.

The Betz limit calculates the maximum power that can be extracted from a volume of moving fluid by an open blade, horizontal axial flow turbine, otherwise referred to as an open-rotor turbine. The Betz limit is derived from fluid dynamic control-volume theory for flow passing through an open rotor. According to the Betz limit, and independent of the design of the fluid turbine, a maximum of 16/27 of the total kinetic energy in a volume of moving fluid can be captured by an open-rotor turbine. Conventional turbines commonly produce 75% to 80% of the Betz limit, or about 44% of the total kinetic energy in a volume of moving fluid.

A fluid turbine power coefficient (Cp) is the power generated over the ideal power available by extracting all the wind kinetic energy approaching the rotor area. The Betz power coefficient of 16/27 is the maximum power generation possible based on the kinetic energy of the flow approaching a rotor swept area. For an open-rotor turbine, the rotor swept area used in the Betz Cp derivation is the system maximum flow area described by the diameter of the rotor blades. The maximum power generation occurs when the rotor flow velocity is the average of the upstream and downstream velocity. This is the only rotor velocity that allows the flow-field to be reversible, and the power extraction to be maximized. At this operating point, the rotor velocity is ⅔ the wind velocity, the wake velocity is ⅓ the wind velocity, and the rotor flow has a non-dimensional pressure coefficient of −⅓ at the rotor exit. The −⅓ pressure coefficient is a result of the rotor wake flow expanding out to twice the rotor exit area downstream of the rotor station.

Induced drag is generated by a rotor blade due to the redirection of fluid during the generation of lift as a column of fluid flows through the rotor plane. The redirection of the fluid may include span-wise flow along the pressure side of the rotor blade along a radial direction toward the blade tip where the fluid then flows over to the opposite side of the blade. The fluid flow over the blade tips joins a chord-wise flow, otherwise referred to as bypass flow, forming rotor-tip vortices. The rotor-tip vortices mix with vortices shed from the trailing edge of the rotor blade to form the rotor wake.

It is commonly known that the rotor wake affects the rotor intake. A column of fluid encounters a rotor as an impediment, in part, because a portion of the fluid flowing around the rotor expands in the wake of the rotor in a form referred to as the stream column. Fluid flowing around the rotor plane is referred to as the bypass flow. Bypass flow passes over the outer surface of the stream column. Increasing lift over the rotor, and hence increasing the amount of energy extracted from the stream column, creates slower moving flow in the rotor wake, therefore, impeding flow through the rotor. This impediment increases the volume of the rotor wake. In other words, as more power is extracted at the rotor, the rotor stream column will expand and more fluid flow will bypass the rotor. If a significant amount of energy is extracted, a majority of the fluid flow will bypass the rotor and the rotor can effectively stop extracting energy. This is referred to as rotor stall. As a result, maximum power is achieved from the two opposing effects of: increased power extraction resulting in relatively lower flow rates; and reduced power extraction resulting in relatively higher flow rates.

When a shrouded turbine is used for increased power extraction, in general, it extracts more power from the fluid stream than an open rotor by increasing the mass flow through the rotor plane, employing specially designed rotor blades to extract more power than their open-rotor turbine counterpart, and then by dissipating the wake to avoid diffuser stall. Diffuser stall occurs when the increased mass flow through the rotor encounters the ambient fluid stream down-stream of the rotor plane and causes a back-pressure at the rotor plane. Proposed solutions to diffuser stall include: increasing the size of the wake area to allow for increased wake expansion; and injecting high-energy fluid into the rotor wake. Both solutions have been proven to allow for increased energy extraction at the rotor.

Aside from the aerodynamic challenge of eliminating the causes of diffuser stall, shrouded turbines have some significant drawbacks. Shrouded turbines are heavier than their open rotor counterparts, they are more expensive to produce and construct, and they create a bluff body when hit by commonly occurring side winds and gusts. Side winds produce a large amount of drag force that places considerable strain on structural components.

Wind shear is the difference in wind speed by height. The higher the wind shear, the higher the wind velocity at the upper region of a rotor plane compared with the wind velocity at the lower regions of the rotor plane. As turbines increase in scale, they take advantage of higher wind velocities at higher altitudes while also experiencing greater wind shear. Extreme wind shear is also responsible for worst case noise emissions that are likely to be out of compliance with existing noise pollution regulations.

Stress and strain on rotor blades is a considerable concern in the wind turbine industry. A rotor blade rotating in a high wind shear environment will experience more downwind flexing while passing through the upper regions of the rotor plane than while passing through the lower regions of the rotor plane due to the variation in wind velocities. As turbines increase in size, the likelihood of greater wind shear also increases.

Noise caused by wind turbines is also a product of the wind velocity and the rotor blade trailing-edge and tip vortices. Trailing-edge and tip vortices create a random noise of similar decibel level, otherwise referred to as white-noise. Tower signature is a term often used to describe the sound created as rotor tip vortices encounter the turbine tower. The tower interrupts the flow of the trailing-edge and tip vortices, occurring as each blade passes the tower introducing a pattern, interrupting the random sound, and creating white noise. As the tower interrupts the vortices, it creates a low-frequency tonal signal of sharply rising and falling pulses. The greatest complaints of turbine noise are with regard to the reoccurring pattern of the tonal signal more so than the white noise generated by wind turbines. Some studies have shown that this tonal signal also occurs in the infrasound range, typically about 0.75 Hz, 1.5 Hz, 2.25 Hz, 3.0 Hz, and so on. At this frequency these pulses may be "felt or sensed" more than "heard" by the ears.

The tip-speed ratio is the ratio between the tangential speed of the rotor blade tip and the actual wind velocity. This is expressed by the following formula:

$$\lambda = \frac{\text{Rotor tip - speed}}{\text{Wind velocity}}$$

The tip-speed can also be calculated as ω times R, where ω is the rotor rotational speed in radians/second, and R is the rotor radius in meters. This is expressed in the following formula:

$$\lambda = \frac{\omega R}{v}$$

The tip-speed ratio is an indicator of the efficiency of the turbine. The power coefficient, Cp is a quantity that expresses the fraction of the power in the wind that is being extracted by the turbine.

$$Cp = \frac{P_E}{P_W}$$

Where $P_E$ is the total energy extracted by a rotor and $P_W$ is the total power in the column of wind that is the velocity of the wind and the diameter of the rotor.

A fluid power coefficient (Cp) is a function of the power generated by the turbine and the total power available in the column of fluid that is the diameter of the rotor plane and the velocity of the fluid. The efficiency of a mechanical generator is less than 100%; therefore, measurements studied are appropriate relative measurements only and do not predict the absolute power coefficient of any of the rotors tested and mentioned herein.

A need exits for a fluid turbine rotor blade that provides increased rotor tip speed, reduced noise due to tip and trailing-edge vortices and tower signature, and reduced blade loading.

SUMMARY

Disclosed herein is an apparatus providing an annular formation of varying relative pressures, creating a rotor blade tip that interacts with the high speed flow over a diffuser, also referred to as a semi-annular airfoil or semi-diffuser, which occupies between 10% and 50% of the rotor swept area of a fluid turbine. A rotor blade tip is designed to both improve rotor tip speed and also to increase the beneficial interaction between a diffuser and a rotor blade.

A dual tip on each rotor blade is designed to take advantage of a high rotor thrust coefficient, providing reduced coefficient of pressure in the rotor-wake and a high flow stream for increased mixing of rotor-wake flow with bypass flow at the exit plane of the rotor.

The fluid power coefficient (Cp) as a function of wake velocity ratio and thrust coefficient (Ct) may be increased because of the low exit-plane pressure coefficient that allows for a relatively higher rotor-thrust coefficient. The rotor design may take advantage of a highly cambered rotor shaft, designed for a greater Cp without stalling as it would without the dual winglet in combination with a semi-shroud.

A ringed airfoil surrounding a rotor swept area increases the mass flow through the rotor plane. This increased mass flow must be returned to ambient fluid stream flow rates in order to prevent diffuser stall. A diffuser segment that occupies less than the whole rotor swept area creates two wake flow conditions. One portion of the rotor wake is similar to an open rotor turbine, the remaining portion flows over the diffuser and has a lower energy flow downstream of the rotor than that of the open rotor fluid stream. As the two wake streams mix, the rotor wake will return to ambient flow conditions with sufficient rapidity to avoid diffuser stall. Diffuser airfoil cross sections that occupy only a portion of a rotor plane may be designed with considerably higher camber and, therefore, higher lift coefficients than those designed to occupy the entire rotor swept area. The relatively higher lift coefficient over the semi-shroud increases tip-speed ratio for any rotor. A rotor without a winglet experiences an increase in tip-speed ratio between 12% and 18% whereas a rotor with a winglet designed to interact with the region of increased mass flow over a semi-shroud airfoil experiences an increase in tip-speed ratio that is between 15% and 25% over that of the same rotor without a semi-shroud.

One skilled in the art understands the importance of tip clearance in regards to shrouded turbines. The gap between the rotor blade tip and the turbine shroud is referred to as tip clearance. Smaller tip clearance is associated with increased effect of the shroud on the rotor. Excessively small tip clearance can result in rotor-shroud interference that can damage both rotor blades and electrical generation equipment. Applying significantly high camber airfoil cross sections and relatively higher lift coefficients in the tip regions of a semi-shroud results in an area of greatest mass flow at the tip regions of the semi-shroud. Therefore, it is possible to have a larger tip clearance at the ends of the semi-shroud than at the center of the semi-shroud. The area of greatest mass flow at the tip region of the semi-shroud guides the rotor tip into alignment with the semi-shroud.

Disclosed herein is an apparatus having a blade tip design that both increases performance in open fluid flow and also increases the performance of a rotor-blade/diffuser interaction. As a rotor blade rotates within a diffuser, the blade tip interacts with an area of increased mass flow. Increased rotor-blade surface area in the region of increased mass flow increases rotor-blade tip speed. That same rotor-blade surface area is also designed to improve the performance of the rotor blade in open-rotor turbine conditions. Therefore, the same rotor blade performs with significantly increased rotor tip speed and significantly increased coefficient of power in both a diffuser augmented environment and an open-rotor environment.

As understood by one skilled in the art, the aerodynamic principles the present disclosure are not restricted to a specific fluid, and may apply to any fluid, defined as any liquid, gas or combination thereof and, therefore, includes water as well as air. In other words, the aerodynamic principles of a dual-tip wind rotor blade apply to hydrodynamic principles in a dual-tip water rotor blade.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same. Example embodiments of the present disclosure are further described with reference to the appended figures. It is to be noted that the various features and combinations of features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein.

DETAILED DESCRIPTION

Figure 1:
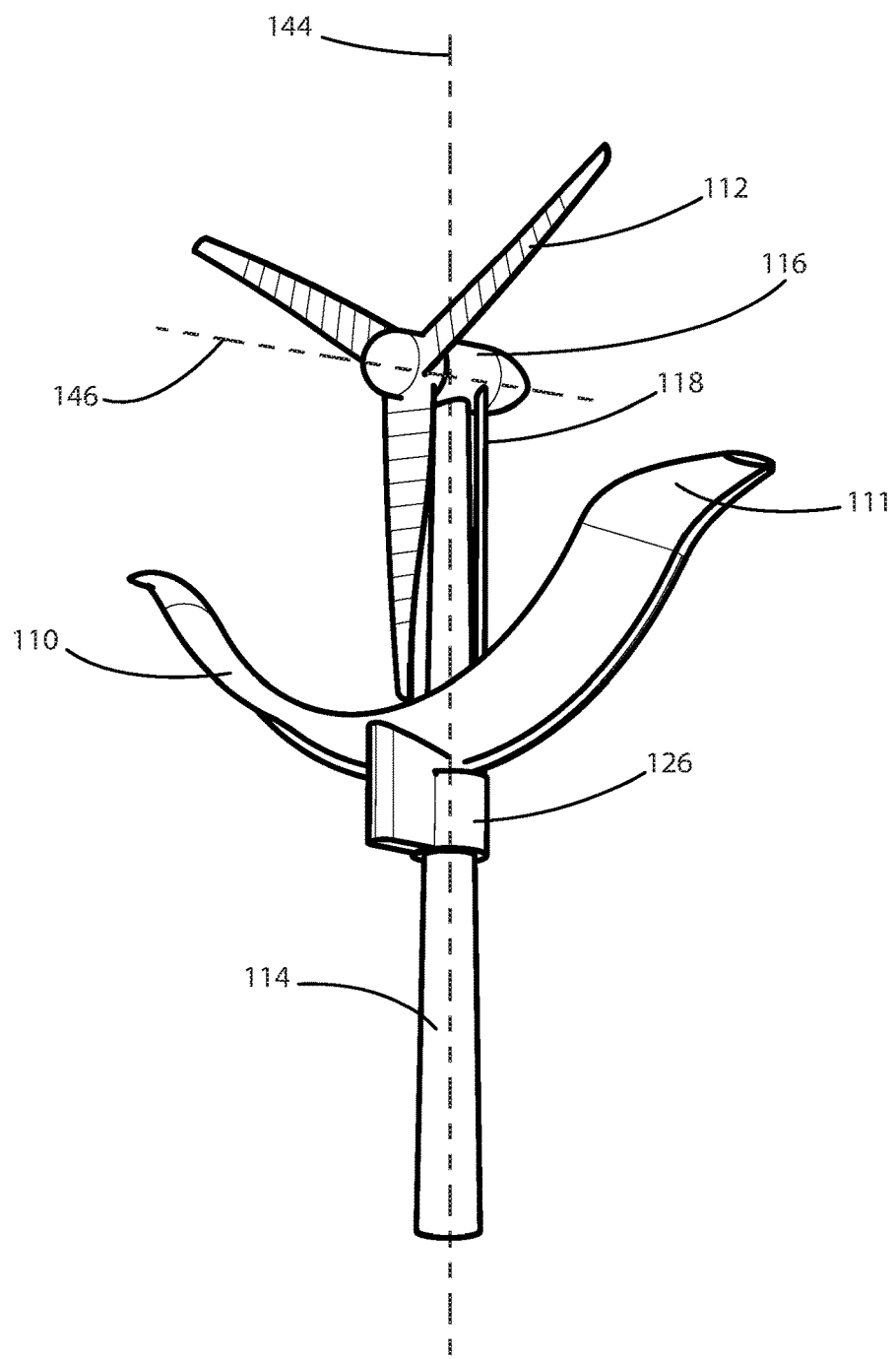
FIG. 1 is front, perspective view of the present embodiment.

The example embodiments disclosed herein are illustrative of advantageous fluid rotor systems, and assemblies of the present disclosure and methods or techniques thereof. It should be understood, however, that the disclosed embodiments are merely examples of the present disclosure, which may be embodied in various forms. Therefore, details disclosed herein with reference to example fluid rotor systems or fabrication methods and associated processes or techniques of assembly and or use are not to be interpreted as limiting, but merely as the basis for teaching one skilled in the art how to make and use the advantageous fluid rotor systems of the present disclosure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the example embodiments.

Although specific terms are used in the following description, these terms are intended to refer to particular structures in the drawings and are not intended to limit the scope of the present disclosure. It is to be understood that like numeric designations refer to components of like function.

The term "rotor" or "rotor assembly" is used herein to refer to any assembly in which blades are attached to a shaft and able to rotate, allowing for the generation of power or energy from fluid rotating the blades. Example embodiments of the present disclosure disclose a fixed-blade rotor or a rotor assembly having blades that do not change configuration so as to alter their angle or attack, or pitch.

In certain embodiments, the leading edge of a rotor assembly may be considered the front of the fluid rotor system, and the trailing edge of a rotor assembly may be considered the rear of the fluid rotor system.

FIG. 1 presents a front perspective view of a rotor/semi-shroud combination of the present disclosure in situ on a wind turbine. A wind turbine has a tower 114 that is rotationally engaged about a vertical axis 144 with a nacelle 116 that houses electrical generation equipment. A rotor comprised of at least one rotor blade 112 is rotationally engaged about a horizontal axis 146 with the nacelle 116 and electrical generation equipment. A semi-shroud 110 is in fluid communication with the rotor blades 112 and is rotationally engaged with the tower 114 about a rotational alignment means 126. Torsion bars 118 are engaged with both the nacelle 116 and with the semi-shroud 110 and ensure that the semi-shroud rotates about a vertical axis at the same rate as the nacelle 116 to avoid collision between the rotor blades 112 and the semi-shroud 110.

In some embodiments, a semi-shroud 110 has varying airfoil cross sections, particularly at the semi-shroud tip 111. One skilled in the art understands that as a rotor approaches a semi-shroud it is important to avoid interference between the rotor blade tip and the semi-shroud. Varying airfoil cross sections at the semi-shroud tip 111 may have relatively higher camber and relatively higher angle of attack providing a relatively higher lift coefficient than the airfoil cross sections along the majority of the semi-shroud 110. One skilled in the art understands that a high lift coefficient will create an area of increased wind velocity for a relatively greater distance from the surface area of the airfoil. The increased lift coefficient and increased wind velocity at a greater distance from the airfoil begins the fluid interaction between the rotor blade and the semi-shroud prior to the rotor blade tip coming into close proximity with the semi-shroud. In other words, the varying airfoil cross sections may be designed to create a means of aligning the rotor blade with the semi-shroud using airflow.

Figure 2:
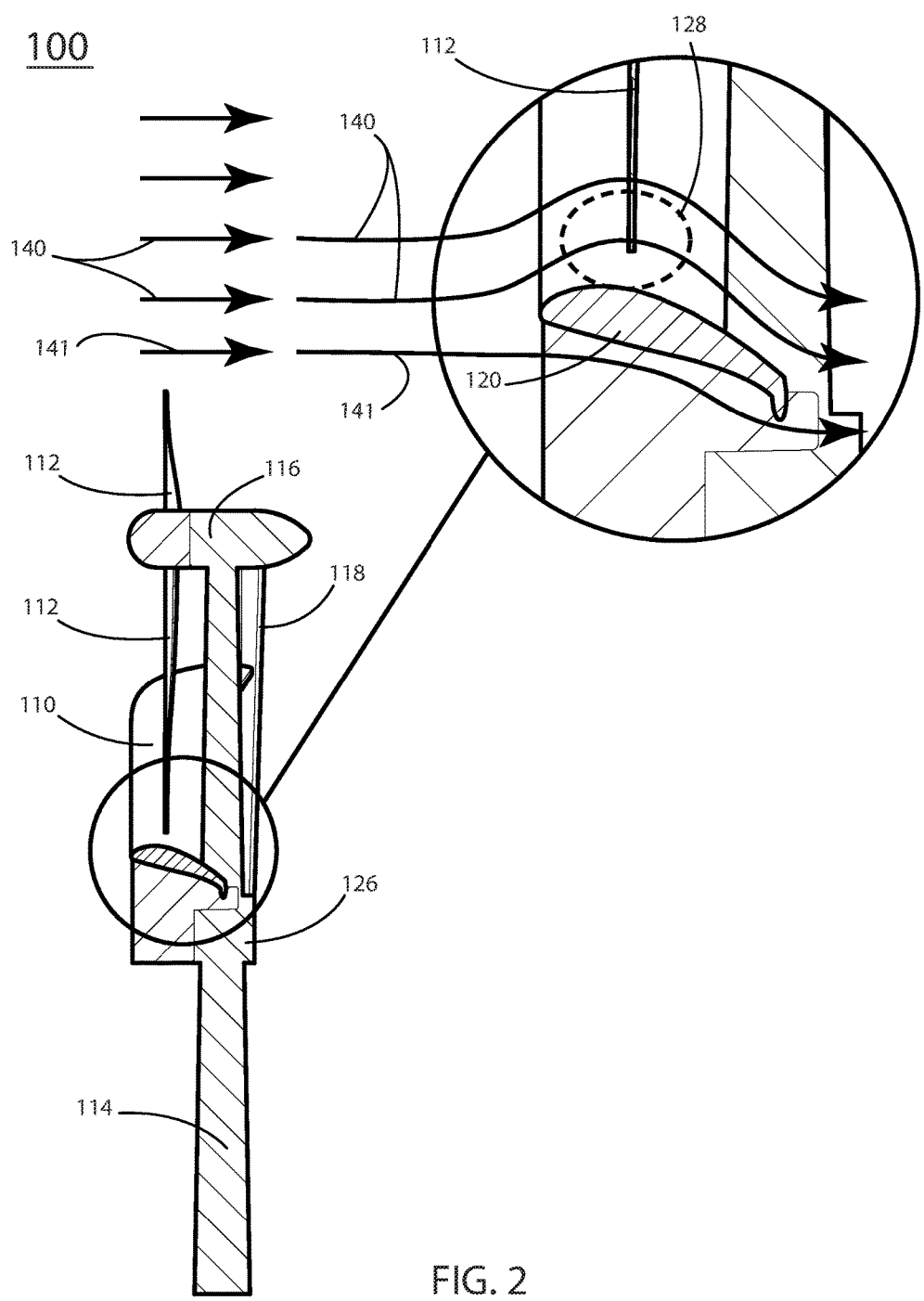
FIG. 2 is a detail, section view of a dual-tip rotor of the present embodiment in combination with a semi-shroud.

FIG. 2 is a detailed cross section view, depicting the fluid interaction between the rotor blade 112 and the semi-shroud 110 in the vicinity of the center of the semi-shroud 110. Wind approaching a turbine 140 encounters an airfoil cross section of a semi-shroud 120 and divides into a higher velocity stream over the lift surface of the airfoil and a lower velocity, higher pressure flow 141 over the pressure surface of the airfoil. The region depicted by dashed line 128 is a region of increased lift that generates the region of relatively greater mass flow through the rotor plane. The increased mass flow provides increased energy that may be extracted by the rotor as it surrounds the tip of the rotor blade 112 thus increasing the blade tip-speed and the coefficient of power.

Figure 3:
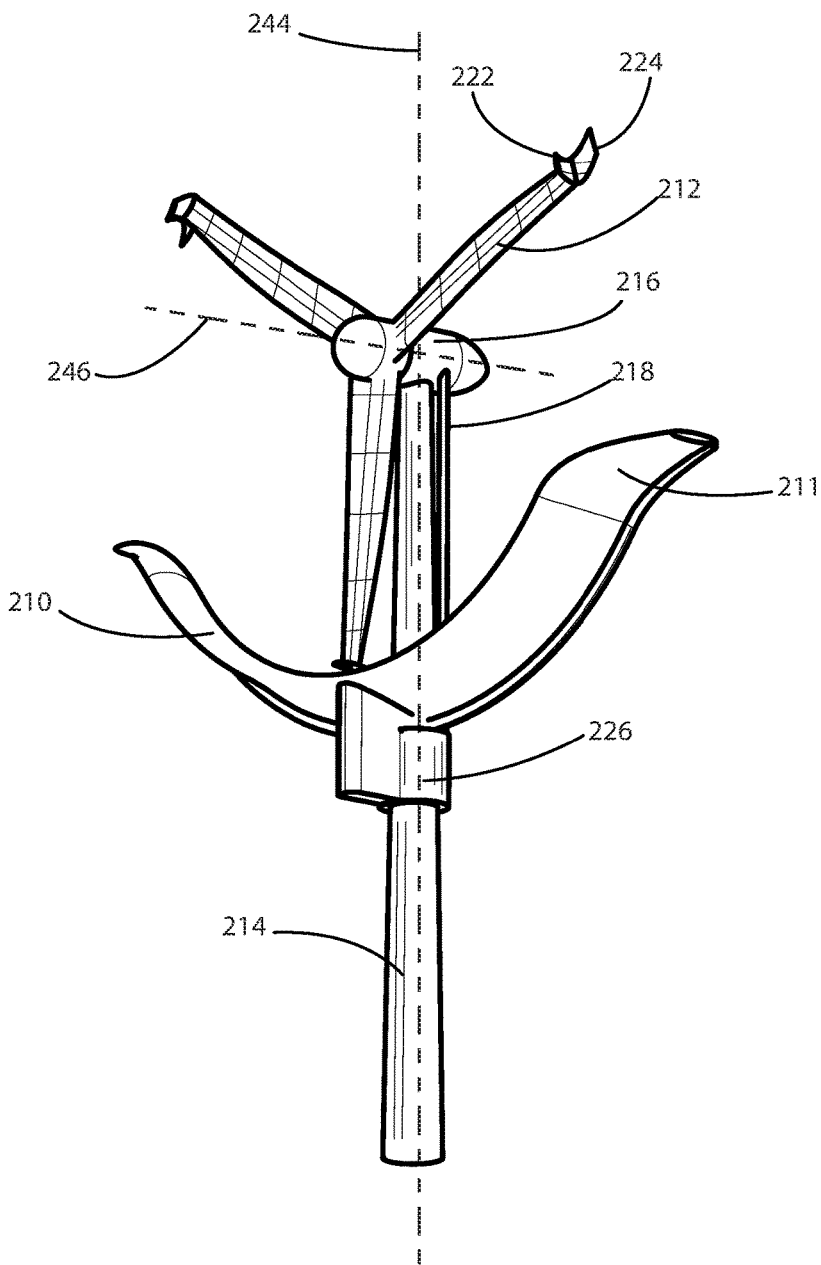
FIG. 3 is front, perspective view of an iteration of the present embodiment.

FIG. 3 is an illustration that depicts an iteration of the embodiment having a dual winglet on the tip of each rotor blade 212. Each dual winglet comprises a forward winglet 222 and a rearward winglet 224. The illustration depicts a rotor/semi-shroud combination of the present disclosure in situ on a wind turbine. A wind turbine has a tower 214 that is rotationally engaged about a vertical axis 244 with a nacelle 216 that houses electrical generation equipment. A rotor comprised of at least one rotor blade 212 is rotationally engaged about a horizontal axis 246 with the nacelle 216 and electrical generation equipment. A semi-shroud 210 is in fluid communication with the rotor blades 212 and is rotationally engaged with the tower 214 about a rotational alignment means 226. Torsion bars 218 are engaged with both the nacelle 216 and with the semi-shroud 210 and ensure that the semi-shroud rotates about a vertical axis at the same rate as the nacelle 216 to avoid collision between the rotor blades 212 and the semi-shroud 210.

In some embodiments, a semi-shroud 210 has varying airfoil cross sections, particularly at the semi-shroud tip 211. One skilled in the art understands that as a rotor approaches a semi-shroud it is important to avoid interference between the rotor blade tip and the semi-shroud. Varying airfoil cross sections at the semi-shroud tip 211 may have relatively higher camber and relatively higher angle of attack providing a relatively higher lift coefficient than the airfoil cross sections along the majority of the semi-shroud 210.

Figure 4:
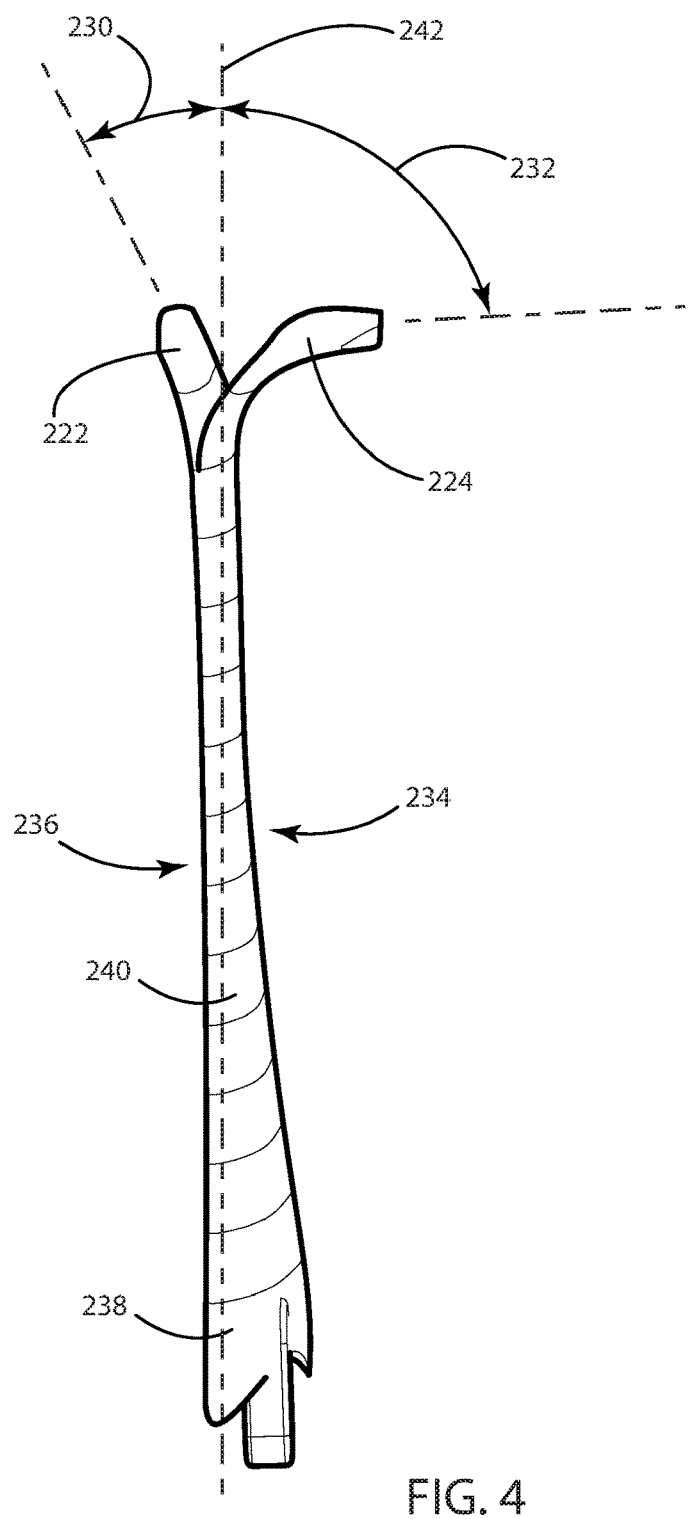
FIG. 4 depicts a rotor blade of the embodiment of FIG. 3.

FIG. 4 depicts a rotor of the present disclosure having a dual winglet. The rotor has a primary structure, otherwise referred to as the rotor shaft 240 that extends from the root 238 to the dual tip along a centerline 242. The shaft 240 has a pressure-surface 236 and a lift surface 234 according to the shape of the airfoil cross section. The rotor blade 200 further comprises a pressure-surface winglet 222 and a lift-surface winglet 224. The pressure-surface winglet 222 turns from the pressure-surface 236 to angle 230 that is between 15° and 35° with respect to a centerline 242. The lift-surface winglet 232 turns from the lift-surface 234 at angle 232 that is between 70° and 120° with respect to the centerline 242.

Figure 5:
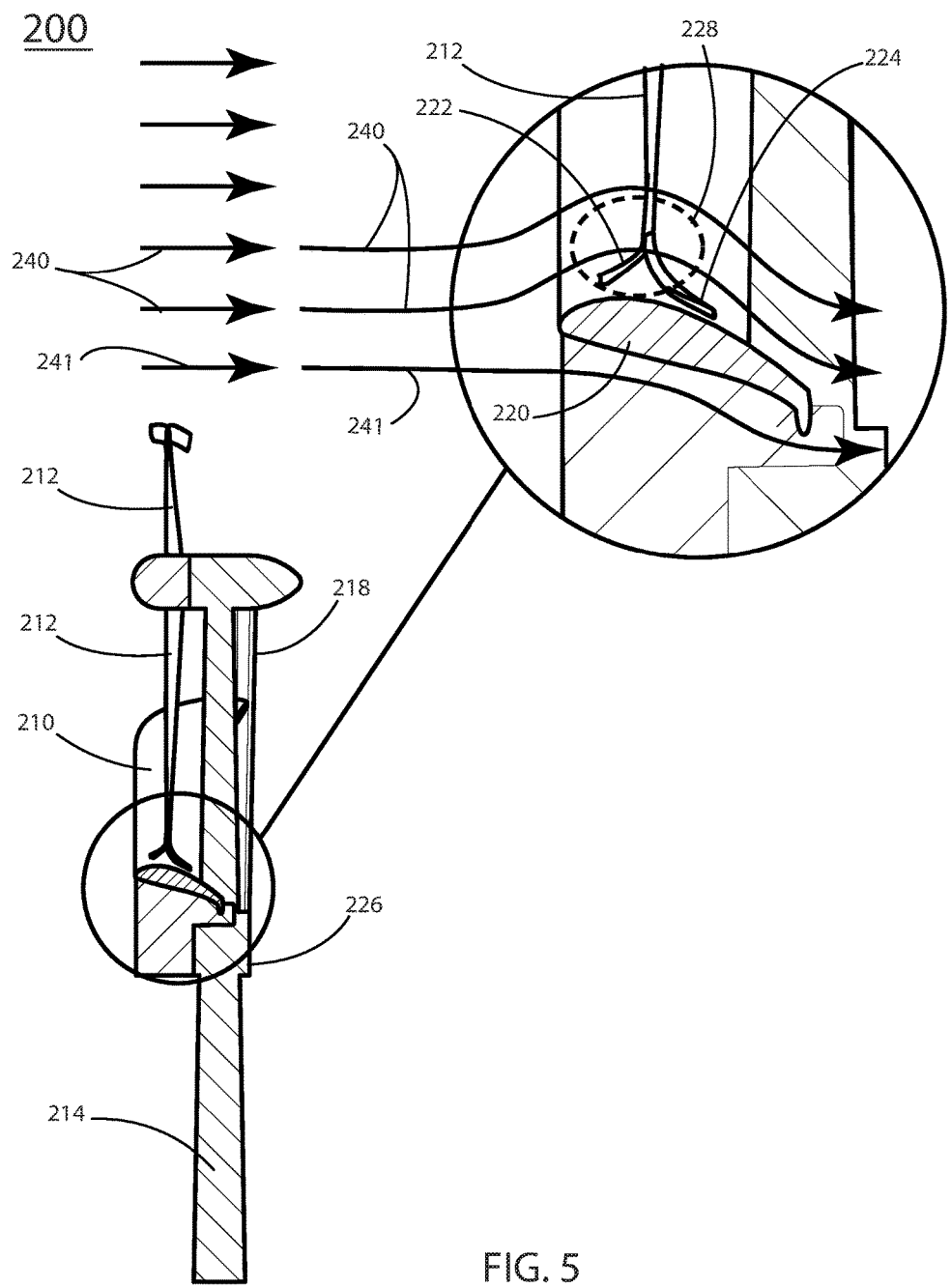
FIG. 5 is a detail, section view of a dual-tip rotor of the embodiment of FIG. 3 in combination with a semi-shroud.

FIG. 5 is a detailed cross section view, depicting the fluid interaction between the rotor blade 212 and the semi-shroud 210 in the vicinity of the center of the semi-shroud 210. The rotor blade 212 has a dual winglet tip that has a relatively greater surface area that interacts with the region of high speed flow, otherwise referred to as the area of greater mass flow 228 over the airfoil of the semi-shroud 220. Wind approaching a turbine 240 encounters an airfoil cross section of a semi-shroud 220 and divides into a higher velocity stream over the lift surface of the airfoil and a lower velocity, higher pressure flow 241 over the pressure surface of the airfoil. The region depicted by dashed line 228 is a region of increased lift that generates the relatively greater mass flow through the rotor plane. The increased mass flow provides increased energy that may be extracted by the rotor as it surrounds the dual tip of the rotor blade 212 thus increasing the blade tip-speed and the coefficient of power. Both the pressure surface winglet 222 and the lift surface winglet 224 are substantially inside the area of greater mass flow 228, providing more rotor-blade surface-area in contact with the area of greater mass flow 228, than that of a rotor blade without a winglet such as 112 (FIG. 2).

Figure 6:
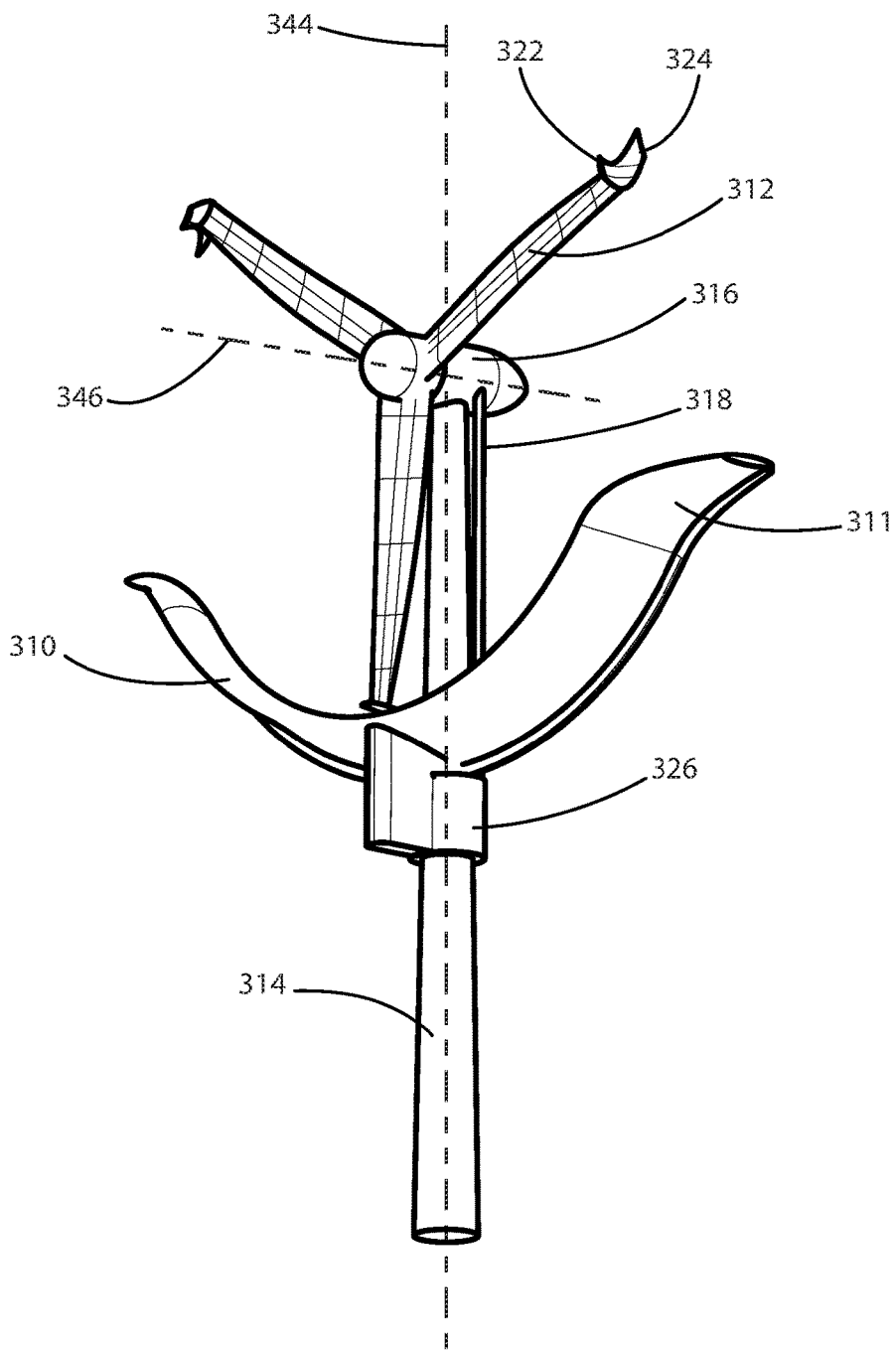
FIG. 6 is front, perspective view of an iteration of the present embodiment.

FIG. 6 is an illustration that depicts an iteration of the embodiment having a dual winglet on the tip of each rotor blade 312. Each dual winglet comprises a forward winglet 322 and a rearward winglet 324. The illustration depicts a rotor/semi-shroud combination of the present disclosure in situ on a wind turbine. A wind turbine has a tower 314 that is rotationally engaged about a vertical axis 344 with a nacelle 316 that houses electrical generation equipment. A rotor comprised of at least one rotor blade 312 is rotationally engaged about a horizontal axis 346 with the nacelle 316 and electrical generation equipment. A semi-shroud 310 is in fluid communication with the rotor blades 312 and is rotationally engaged with the tower 314 about a rotational alignment means 326. Torsion bars 318 are engaged with both the nacelle 316 and with the semi-shroud 310 and ensure that the semi-shroud rotates about a vertical axis at the same rate as the nacelle 316 to avoid collision between the rotor blades 312 and the semi-shroud 310.

Figure 7:
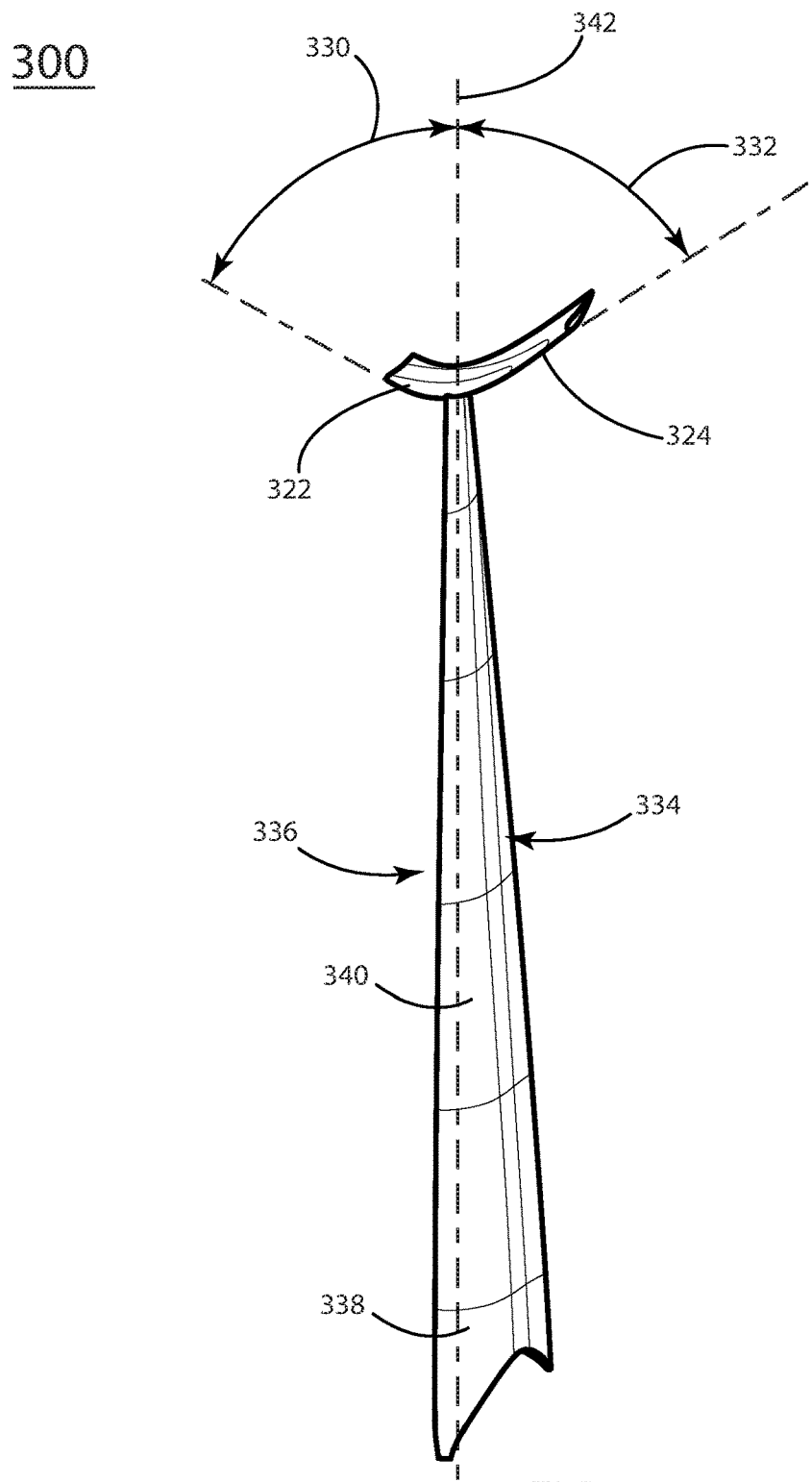
FIG. 7 depicts a rotor blade of the embodiment of FIG. 6.

FIG. 7 is an illustration that depicts an iteration of a rotor blade design the embodiment having a dual winglet on the tip of each rotor blade 300. The rotor has a primary structure, otherwise referred to as the rotor shaft 340 that extends from the root 338 to the dual tip along a centerline 342. The shaft 340 has a pressure-surface 336 and a lift surface 334 according to the shape of the airfoil cross sections. The rotor blade 300 further comprises a winglet that transitions arcuately from a pressure-surface portion 322 to a lift-surface portion 324. The pressure-surface portion 322 resides between the centerline 342 and the upwind end of the winglet 322, at an angle 330 that is between 15° and 35° with respect to a centerline 342. The lift-surface portion 332 resides between the centerline 342 and the downwind end of the winglet 324 that is between 70° and 120° with respect to the centerline 342. A point along the arcuate curve of the winglet is tangent with a plane that is perpendicular to the centerline 342. One skilled in the art understands that the winglet exists in the upwind area and the downwind area with respect to the centerline and that the airfoil cross sections at either end of the arcuate winglet may be similar to those that transition from the lift surface 334 and pressure surface 336 as illustrated in the aforementioned embodiment (FIG. 4) without the separation otherwise referred to as a crease that exists in the embodiment of FIG. 4.

Figure 8:
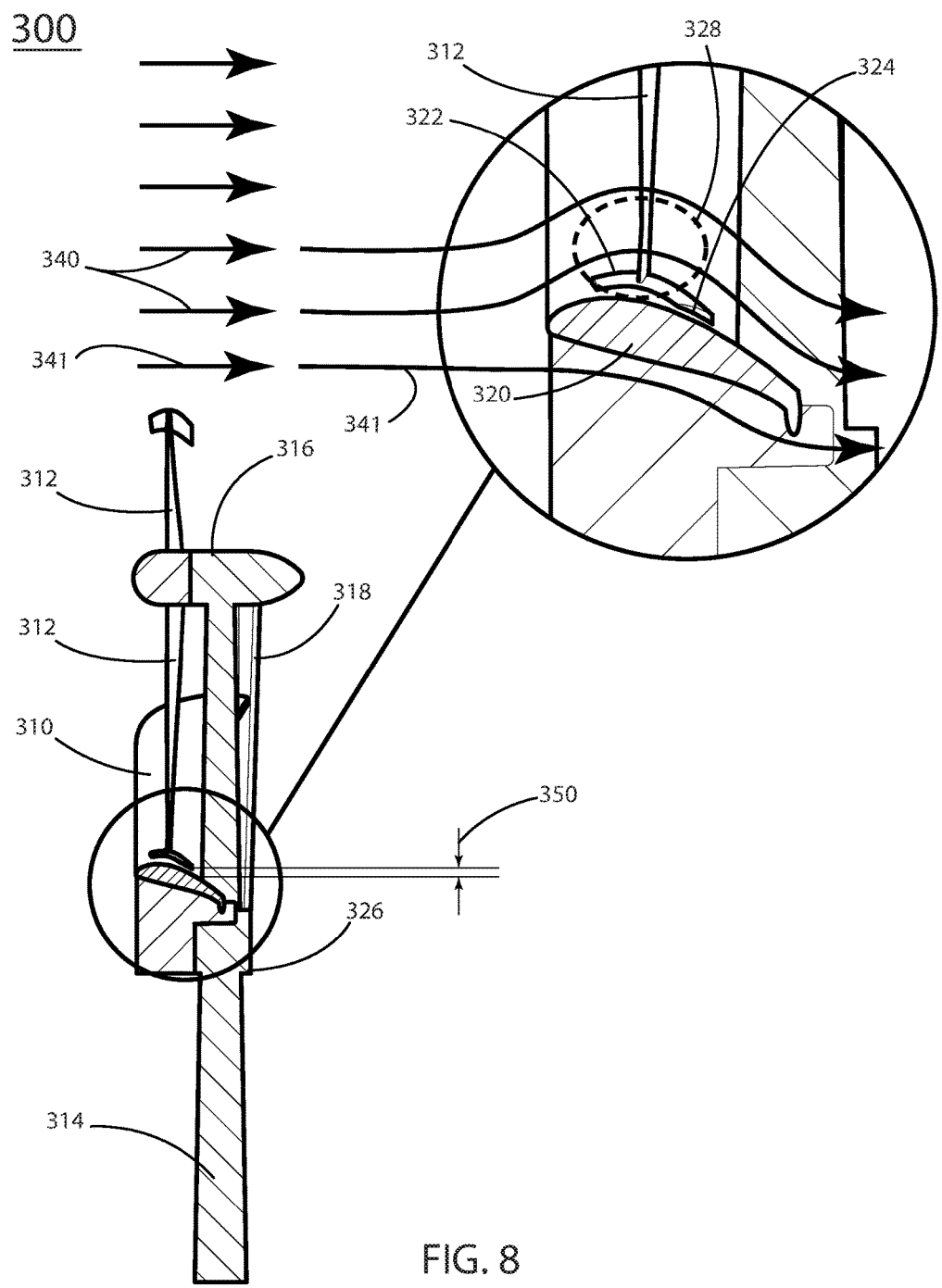
FIG. 8 is a detail, section view of a dual-tip rotor of the embodiment of FIG. 6 in combination with a semi-shroud.

FIG. 8 is a detailed cross section view, depicting the fluid interaction between the rotor blade 312 and the semi-shroud 310 in the vicinity of the center of the semi-shroud 310. Wind approaching a turbine 340 encounters an airfoil cross section of a semi-shroud 320 and divides into a higher velocity stream over the lift surface of the airfoil and a lower velocity, higher pressure flow 341 over the pressure surface of the airfoil. The region depicted by dashed line 328 is a region of increased lift that generates the relatively greater mass flow through the rotor plane. The increased mass flow provides increased energy that may be extracted by the rotor as it surrounds the tip of the rotor blade 312 thus increasing the blade tip-speed and the coefficient of power. The tip clearance is the distance between the furthest point of a rotor blade from the rotor center and the surface of the semi-shroud. The tip clearance when a rotor blade is proximal to the center of the semi-shroud is between 0.5% and 3% of the rotor blade length and is illustrated by measurement lines 350.

Figure 9:
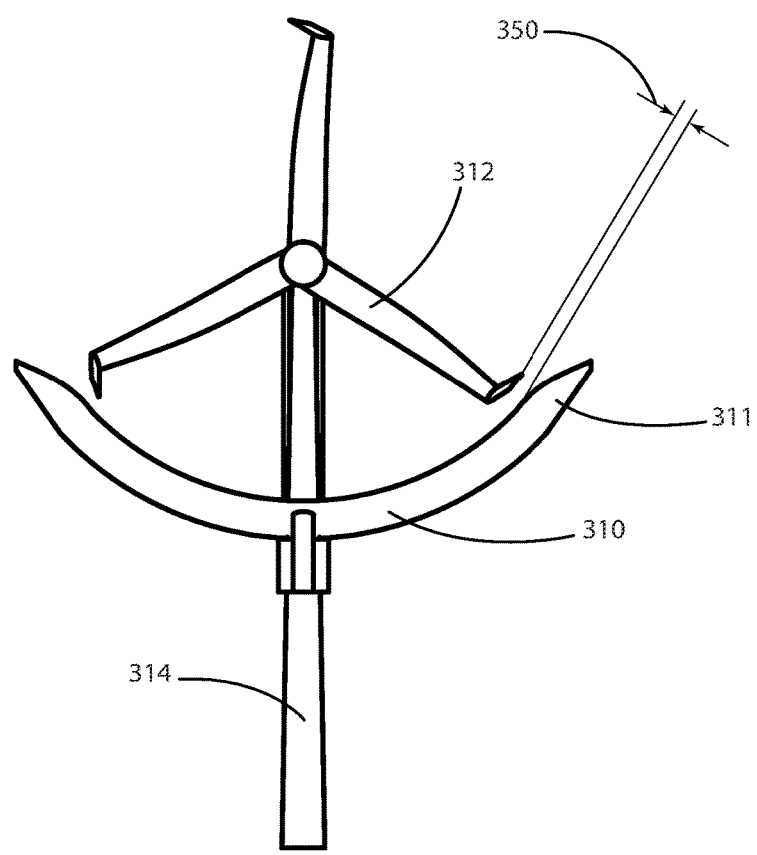
FIG. 9 is front, perspective view of an iteration of the present embodiment.

FIG. 9 is a front view of the embodiment, illustrating the tip clearance when rotor blades are proximal to the ends of the semi-shroud. Tip clearance at the ends of the semi-shroud is between 1% and 6% of the rotor blade length.

Figure 10:
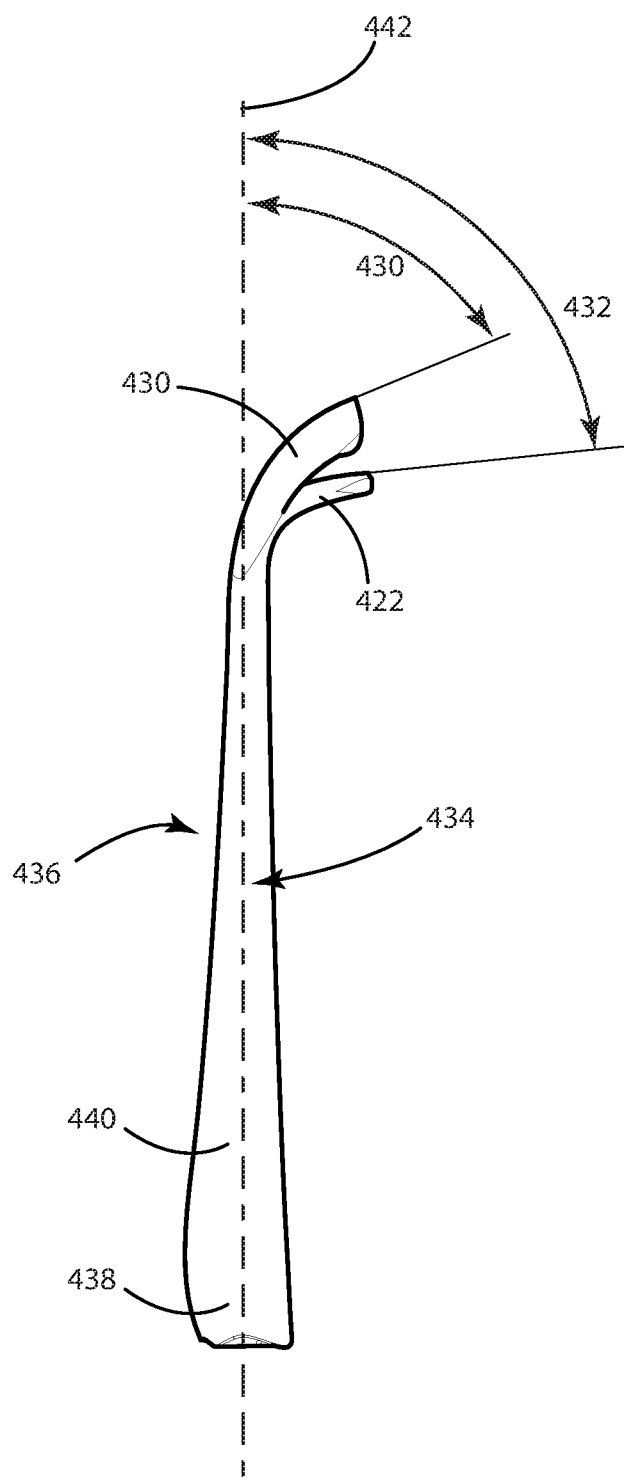
FIG. 10 depicts a rotor blade of the embodiment.

FIG. 10 is an illustration that depicts an iteration of a rotor blade design the embodiment having a dual winglet on the tip of a rotor blade 400. The rotor has a primary structure, otherwise referred to as the rotor shaft 440 that extends from the root 438 to the dual tip 430/422 along a centerline 442. The shaft 440 has a pressure-surface 436 and a lift surface 434 according to the shape of the airfoil cross sections. The rotor blade 400 further comprises a first winglet 430 that transitions arcuately from the pressure-surface 436. The pressure-surface winglet 430 resides at an angle 430 that is between 75° and 85° with respect to a centerline 442. A second winglet 422 transitions arcuately from the lift surface 434. The lift-surface winglet 422 resides at an angle that is between 80° and 120° with respect to the centerline 442.

Figure 11:
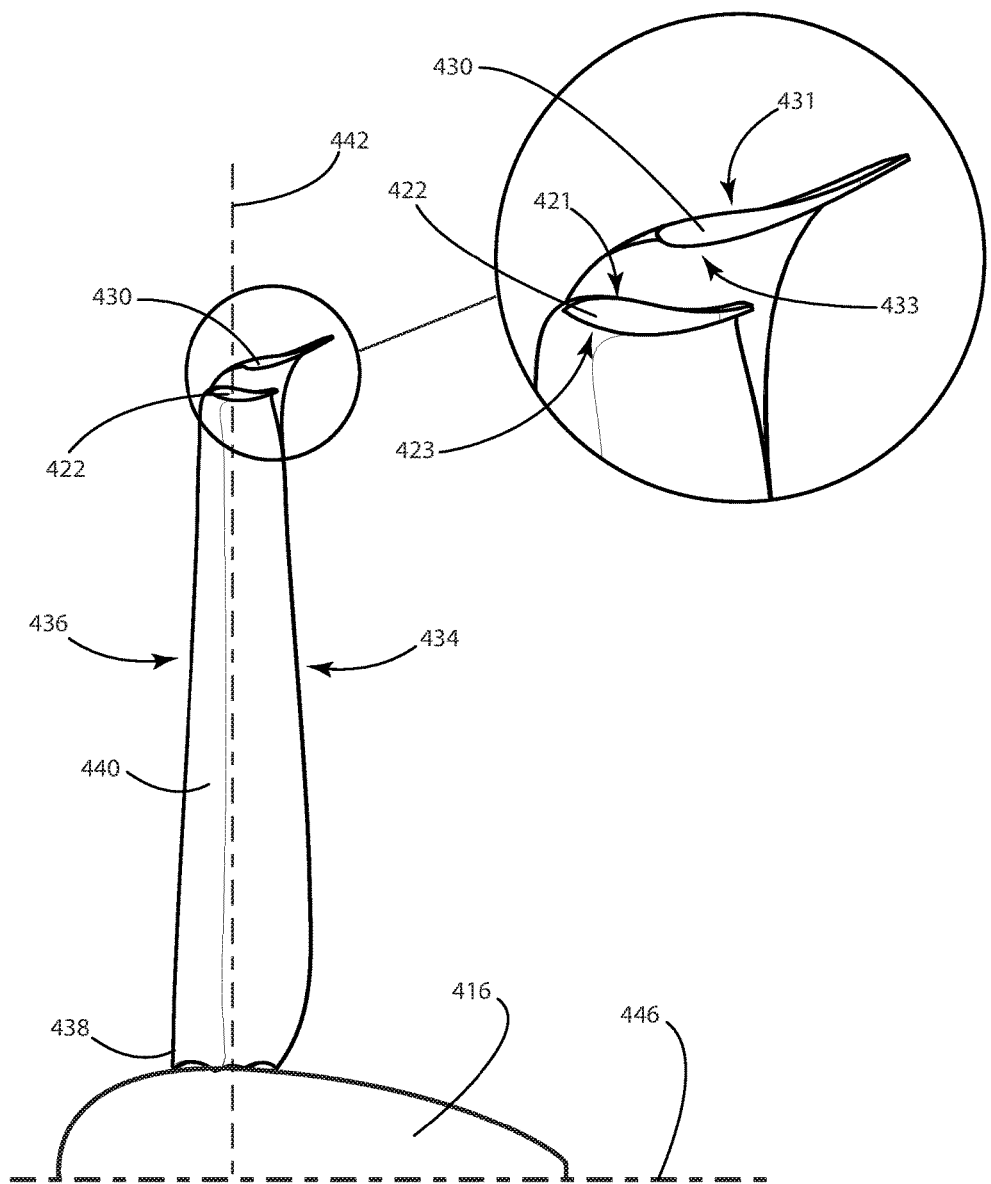
FIG. 11 is a detail, section view of a dual-tip rotor of the embodiment on a turbine without a semi-shroud.

FIG. 11 presents a detailed view of a double winglet. The rotor shaft 440 is rotationally engaged at the root 438 with a nacelle 416 shown in section view against a centerline 446. The lift-surface winglet 422 has a lift surface 421 and a pressure surface 423. The pressure surface 423 transitions from the lift surface 434 of the primary shaft 440. The pressure-surface winglet 430 is an airfoil that has a lift side 431 and a pressure side 433. One skilled in the art will understand that the lift surfaces will create increase velocity when compared to the pressure surface. Two streams are created as the fluid stream encounters each of the winglets.

Figure 12:
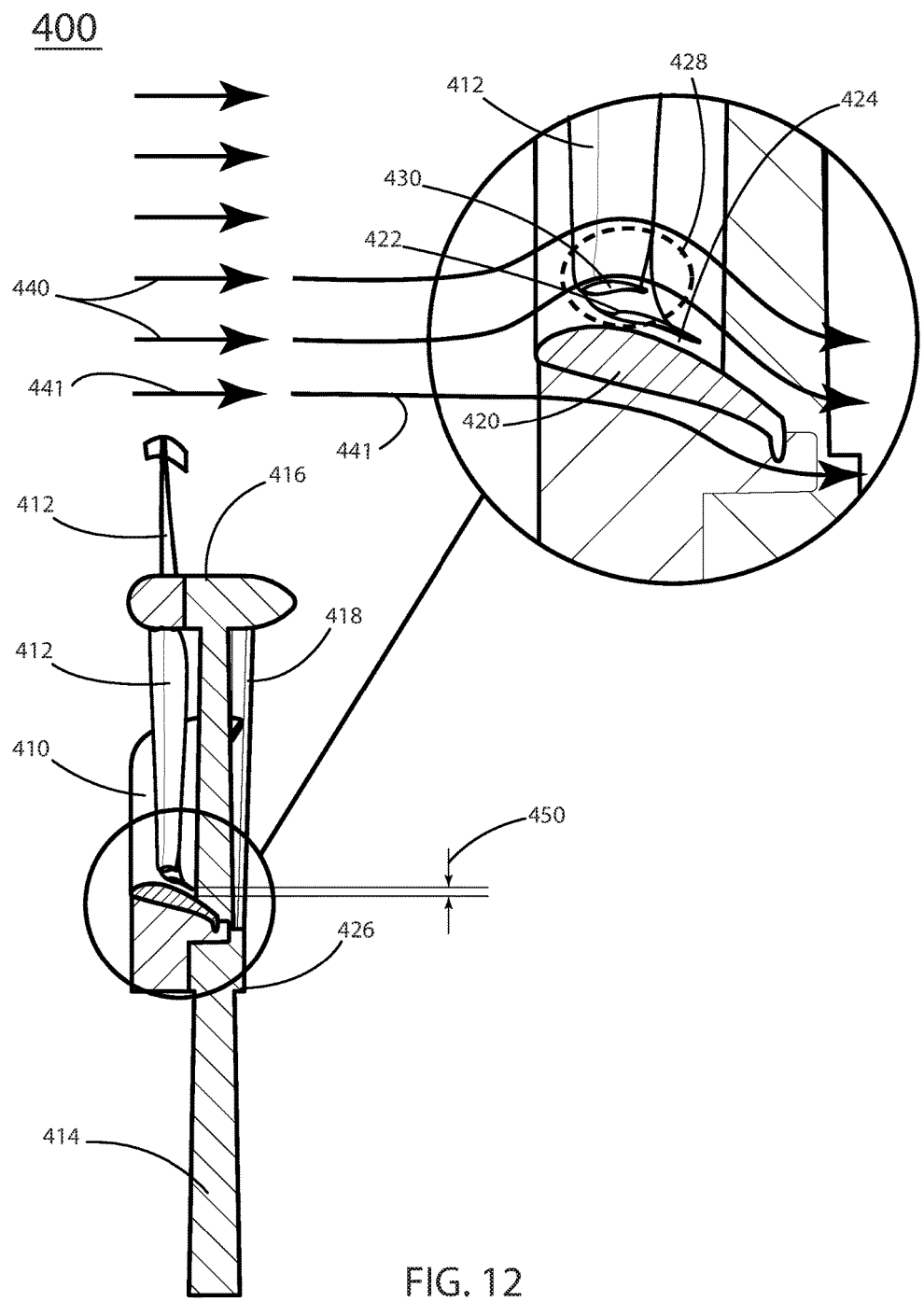
FIG. 12 is a detail, section view of a dual-tip rotor of the embodiment of FIG. 10 in combination with a semi-shroud.

FIG. 12 is a detailed cross section view, depicting the fluid interaction between the rotor blade 412 and the semi-shroud 410 in the vicinity of the center of the semi-shroud 410. Wind approaching a turbine 440 encounters an airfoil cross section of a semi-shroud 420 and divides into a higher velocity stream 440 over the lift surface of the airfoil and a lower velocity, higher pressure flow 441 over the pressure surface of the airfoil. The region depicted by dashed line 428 is a region of increased lift that generates the relatively greater mass flow through the rotor plane. The increased mass flow provides increased energy that may be extracted by the rotor as it surrounds the tip of the rotor blade 412 thus increasing the blade tip-speed ratio and the coefficient of power. The tip clearance is the distance between the furthest point of a rotor blade from the rotor center and the surface of the semi-shroud. Both winglets 430 and 422 interact with the area of increased mass flow 428 and each contributes to the increased tip-speed ratio. The tip clearance when a rotor blade is proximal to the center of the semi-shroud is between 0.5% and 3% of the rotor blade length and is illustrated by measurement lines 350.

The present disclosure has been described with reference to example embodiments. Modifications and alterations will occur to others upon reading and understanding the preceding detailed description. It is intended that the present disclosure be construed as including all such modifications and alterations insofar as they come within the scope of the appended claims or the equivalents thereof.

Although the systems and methods of the present disclosure have been described with reference to example embodiments thereof, the present disclosure is not limited to such example embodiments and or implementations. Rather, the systems and methods of the present disclosure are susceptible to many implementations and applications, as will be readily apparent to persons skilled in the art from the disclosure hereof. The present disclosure expressly encompasses such modifications, enhancements and or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A rotor blade for a fluid turbine in combination with a semi-annular airfoil comprising:
   a rotor blade for a fluid turbine comprising:
      an upwind direction; and
      a downwind direction; and
      a root region; and
      a tip region; and
      a long axis extending from said root region to said tip region; and
      a body extending along said long axis, from said root region to said tip region; and
      said body further comprising an airfoil cross section, said airfoil cross section comprising:
         a leading edge; and
         a trailing edge; and
         a lift surface; and
         a pressure surface; and
      said tip region comprising a first winglet and a second winglet; and
      said first winglet extending arcuately away from said lift surface in said downwind direction; and
      said leading edge transitioning along said first winglet toward said trailing edge; and
      said second winglet extending arcuately away from said pressure surface in said upwind direction; and
      said leading edge transitioning along said second winglet toward said trailing edge; said rotor blade rotationally engaged with said fluid turbine wherein said fluid turbine has a central axis about which at least one said rotor blade rotates about thus providing a rotor swept area; and
   said rotor swept area in fluid communication with a semi-annular airfoil comprising:
      an airfoil cross section; having
      an upwind direction; and
      a downwind direction; and
      a lift surface facing upward; and
      a pressure surface facing downward; and
   said semi-annular airfoil in fluid communication with said at least one rotor blade, proximal to the perimeter of said rotor swept area located at the lower region of said rotor swept area; wherein
   the rotor swept area is in fluid communication with the lift surface of said semi-annular airfoil in the lower region of the rotor swept area.

2. The rotor blade of claim 1 wherein said pressure surface winglet turns arcuately from said pressure surface at an angle between 15° and 35°.

3. The rotor blade of claim 1 wherein said lift surface winglet turns arcuately from said lift surface at an angle between 70° and 120°.

4. The rotor blade of claim 1 wherein:
   said first winglet is at least twice as long as said second winglet.

5. A rotor blade for a fluid turbine in combination with a semi-annular airfoil comprising:
   a rotor blade for a fluid turbine comprising:
      an upwind direction; and
      a downwind direction; and
      a root region; and
      a tip region; and
      a long axis extending from said root region to said tip region; and
      a body extending from said root region to said tip region; and said body further comprising airfoil cross sections, said
   airfoil cross sections each comprising:
   a leading edge; and
   a trailing edge; and
   a lift surface; and
   a pressure surface; and
said tip region comprising an arcuate winglet having a
   airfoil cross sections arrayed along an arcuate centerline; and
said arc being tangent to an imaginary plane that is
   perpendicular to the end point of said long axis; and
said rotor blade rotationally engaged with said fluid
   turbine wherein said fluid turbine has a central axis
   about which at least one said rotor blade rotates about
   thus providing a rotor swept area; and
said winglet in fluid communication with a semi-annular
   airfoil comprising:
   an airfoil cross section; having
   an upwind direction; and
   a downwind direction; and
   a lift surface facing upward; and
   a pressure surface facing downward; and
said semi-annular airfoil in fluid communication with said
   at least one rotor blade, proximal to the perimeter of
   said rotor swept area located at the lower region of said
   rotor swept area; and
the rotor swept area is in fluid communication with the lift
   surface of said semi-annular airfoil in the lower region
   of the rotor swept area; wherein
said arcuate centerline is parallel to the lift surface of said
   semi-annular airfoil.

6. The rotor blade for a fluid turbine in combination with
a semi-annular airfoil of claim 5 further comprising:
   a region of relatively increased fluid velocity stream over
      said semi-annular airfoil; and
   said winglet rotating through said region of relatively
      increased fluid velocity stream; wherein said winglet
      surface area providing contact with said increased fluid
      velocity stream.

7. A rotor blade for a fluid turbine in combination with a
semi-annular airfoil comprising:
   a rotor blade for a fluid turbine comprising:
   an upwind direction; and
   a downwind direction; and
   a root region; and
   a tip region; and
   a long axis extending from said root region to said tip
      region; and
   a body extending from said root region to said tip region;
      and
   said body further comprising airfoil cross sections, said
      airfoil cross sections each comprising:
      a leading edge; and
      a trailing edge; and
      a lift surface; and
      a pressure surface; and
   said tip region comprising an arcuate winglet having a
      airfoil cross sections arrayed along an arcuate centerline; and
   said arc being tangent to an imaginary plane that is
      perpendicular to the end point of said long axis; and
   said rotor blade rotationally engaged with said fluid
      turbine wherein said fluid turbine has a central axis
      about which at least one said rotor blade rotates about,
      thus providing a rotor swept area; and
   said winglet in fluid communication with a semi-annular
      airfoil comprising:
      an airfoil cross section; having
      an upwind direction; and
      a downwind direction; and
      a lift surface facing upward; and
      a pressure surface facing downward; and
   said semi-annular airfoil in fluid communication with said
      at least one rotor blade, proximal to the perimeter of
      said rotor swept area and having a tip clearance that is
      the distance from the tip region of the rotor blade to the
      surface of the semi-annular airfoil; and
   the tip clearance at the center of the semi-annular airfoil
      being smaller than the tip clearance at the ends of the
      semi-annular airfoil.

8. A rotor blade for a fluid turbine in combination with a
semi-annular airfoil comprising:
   a rotor blade for a fluid turbine comprising:
   an upwind direction; and
   a downwind direction; and
   a root region; and
   a tip region; and
   a long axis extending from said root region to said tip
      region; and
   a body extending from said root region to said tip region
      along said long axis; and
   said body further comprising airfoil cross sections, said
      airfoil cross sections each comprising:
      a leading edge; and
      a trailing edge; and
      a lift surface; and
      a pressure surface; and
   said tip region comprising a first winglet having an airfoil
      cross section that transitions arcuately away from said
      pressure surface toward said trailing edge; and
   said first winglet transitioning arcuately to an angle that is
      between 75° and 85° with respect to said long axis; and
   said tip region further comprising a second winglet having
      an airfoil cross section that transitions arcuately away
      from said lift surface toward said trailing edge: and
   said second winglet transitioning arcuately to an angle
      that is between 80° and 120° with respect to said long
      axis; and
   said rotor blade rotationally engaged with said fluid
      turbine wherein said fluid turbine has a central axis
      about which at least one said rotor blade rotates about,
      thus providing a rotor swept area; and
   said dual winglet in fluid communication with a semi-annular airfoil comprising:
      an airfoil cross section; having
      an upwind direction; and
      a downwind direction; and
      a lift surface facing upward; and
      a pressure surface facing downward; and
   said semi-annular airfoil in fluid communication with said
      at least one rotor blade, proximal to the dual winglet;
      wherein the dual winglet passes through a region above
      the lift surface of the semi-annular airfoil resulting in
      an increase in the rotor tip-speed ratio that is between
      15% and 25% over that of the same rotor without
      interaction with said semi-annular airfoil.

* * * * *